United States Patent Office 3,090,756
Patented May 21, 1963

3,090,756
METHOD AND MEANS FOR INHIBITING FREEZING OF WETTED GRANULAR MATERIALS
Dale W. Kaufmann, Buffalo, N.Y., assignor to International Salt Company, Scranton, Pa.
No Drawing. Filed Dec. 3, 1956, Ser. No. 625,631
1 Claim. (Cl. 252—71)

This invention relates to a method and means for inhibiting freezing of wetted piles of granular materials, such as coal, ore, limestone, gravel, sand, clay, and other rock-like or earth-like materials or the like; in situ or while being stock-piled or shipped by boat, railroad, automotive trucks, etc., and consequently exposed to rainfall, snow, and freezing temperatures. It is well known for example that in connection with the various industries the shipment of granular materials such as aforesaid during freezing weather has heretofore presented serious problems, particularly in connection with the loading and unloading of such materials to and from transport vehicles. This application is a continuation-in-part of my copending application Serial No. 485,344, filed January 31, 1955, now abandoned.

It has been heretofore recognized that addition of sodium chloride salt for example to coal or sand or gravel or the like may under some conditions assist in reducing the tendency to freezing, but it has also been noted that under certain alternating wetting and drying conditions, addition of a pure sodium chloride salt to a carload of granular material or the like will sometimes produce a pronounced "caking" tendency due to the intergrowth of recrystallized salt crystals interiorly of the granular load; thereby tending to cement the latter together into the form of a consolidated mass.

The present invention contemplates employment of a modified salt composition as an additive to a granular material in situ, or in a stock pile or transport load, such as will protect the latter against both freezing and "caking;" even though the granular material be subjected to alternate wetting and drying and/or freezing temperatures, such as during typical winter-weather quarrying and storage and transport operations. To accomplish this purpose the invention contemplates addition to the granular material of a composite salt mixture in the form of a soluble chemical which is operable to depress the freezing point of the water entrained within the granular material incidental to rainfall or snowfall or the like; said soluble chemical having as ingredients thereof materials selected from the groups of materials which will avoid growth of cementitious type chemical crystals between the granules of the treated material.

For example, it has been discovered that a mixture of sodium chloride salt and a relatively small proportion of an alkali metal iron cyanide such as the ferro- or ferricyanides of sodium, potassium, ammonium, or calcium will operate to provide the desired results. Because sodium ferrocyanide is relatively cheap, yet highly effective for the purposes of the present invention, it may be preferred in this instance. Tests have shown that for the purposes of the present invention, a mixture of sodium ferrocyanide in the proportion of one-half parts, or more, per million parts of sodium chloride salt (by weight) may be sprinkled into a railroad hopper type coal car, for example, in the amount of four hundred pounds or more of treated salt to the carload of coal. This will protect the load of coal against freezing to the point that would make unloading difficult, even though the car is exposed to severe rainfall and/or snowfall under temperatures as low as 20° F. or lower, during transit. Theoretically, an excess of the iron cyanide salt additive to the sodium chloride salt content might not commensurably increase the "caking" inhibition action of the compound; but as a practical matter, in order to insure a distribution safety factor, an excess of iron cyanide salt would be preferably employed, say in the range of one-half pound to eight pounds of iron cyanide salt to one ton of sodium chloride salt. Also, such provision of an excess of iron cyanide salt would provide a safeguard against continuous rainfall leaching effects, such as might otherwise cause leaching and dilution of the iron cyanide salt content to a state of ineffectiveness.

Thus, the present invention provides a composite salt additive to be mixed into a granular mass, which is actually more effective than simple sodium chloride for the intended purpose in the sense that it avoids or retards intergrowth crystallization formations such as are cementitious in character. Consequently, the granular material mass which has been treated by the composite salt additive of the invention will be less subject to freezing and/or caking under typical winter storage, handling, or quarrying conditions. The composite salt additive of the present invention may be either sprinkled into or upon the granular mass to be treated during loading or stock piling thereof; or in lieu thereof, the additive composition may be fed to the granular mass to be treated by spraying or sprinkling of the latter with a water solution thereof. As explained hereinabove, only a relatively small amount of the additive substance will perform in accord with the present invention to preclude caking of bulk salt, as explained hereinabove, but it will be appreciated that the additive must be thoroughly distributed throughout the salt bulk in order to be effective for the intended purpose. To facilitate uniform and thorough distribution of the additive material throughout any given salt bulk, it has been determined that the additive substance may be beneficially furnished to the ultimate user in the form of an admixture in a relatively inert vehicle or diluent such as powdered limestone, powdered gypsum, powdered wollastonite, or some other relatively insoluble granular substance.

Thus, for example, a pound or so of the cyanide salt may be mixed into a fifty or hundred pound sack of powdered limestone and thus will be adapted to be relatively easily sprinkled and mixed into a ton or two of bulk salt for the purposes explained hereinabove. Also, some additional additives such as a fatty acid or derivative thereof or the like may be beneficially added to the cyanide content of the additive mixture to improve the anti-freeze characteristics, and also to assist in spreading the cyanide mixture throughout the rock salt bulk. Substances suitable for such purposes include, for example, stearic acid, palmitic acid, palm kernel fatty acid, coconut fatty acid or other constituent acids of the fats; also alkali and alkali earth salts of the fatty acids, such as sodium stearates; also glyceryl salts of the fatty acids, such as glyceryl stearate; also surface-active agents such as sodium salts of fatty alcohol sulfates and sulfonates known as sulfated aliphatic esters or "sulfonated oils," also mineral oil or grease or other substances of an oily or greasy nature.

Still further, some suitable sticking agent such as glue, agar, Irish moss, or other suitable gel or colloid substance may be beneficially added in order to cause the cyanide salt to adhere to the rock salt crystals and to stay in place for optimum performance in accord with the intended purpose.

I claim:

The method for inhibiting freezing of a mass of wetted inert granular material comprising mixing into said material a mixture of a granular inert filler material and an anti-freeze salt and a substantial amount of an alkali metal iron cyanide and a compatible fatty acid derivative and a compatible sticking agent, to at least partially coat said granular material particles with an iron cyanide and salt mixture to retard the freezing together tendencies of treated material granules.

References Cited in the file of this patent

UNITED STATES PATENTS

| | | |
|---|---|---|
| 1,371,032 | Kendrick | Mar. 8, 1921 |
| 1,825,151 | Keoleian | Sept. 29, 1931 |
| 1,894,752 | Bozard | Jan. 17, 1933 |
| 2,192,320 | McCarthy | Mar. 5, 1940 |
| 2,308,289 | Lawrence | Jan. 12, 1943 |
| 2,615,009 | John et al. | Oct. 21, 1952 |

FOREIGN PATENTS

| | | |
|---|---|---|
| 165,646 | Sweden | Feb. 8, 1954 |
| 528,620 | Belgium | May 31, 1954 |
| 1,097,493 | France | Feb. 16, 1955 |
| 752,582 | Great Britain | July 11, 1956 |